US011460996B2

(12) United States Patent
Bemel-Benrud et al.

(10) Patent No.: US 11,460,996 B2
(45) Date of Patent: *Oct. 4, 2022

(54) MODIFYING STYLE LAYER PROPERTIES OF A DIGITAL MAP

(71) Applicant: Mapbox, Inc., San Francisco, CA (US)

(72) Inventors: Saman Bemel-Benrud, Washington, DC (US); Thomas Christopher MacWright, Washington, DC (US); Eden Halperin, San Francisco, CA (US); Lauren Budorick, San Francisco, CA (US); Qian Gao, Washington, DC (US); Scott Andrews, San Francisco, CA (US)

(73) Assignee: Mapbox, Inc., Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,670

(22) Filed: Apr. 12, 2021

(65) Prior Publication Data

US 2021/0232304 A1 Jul. 29, 2021

Related U.S. Application Data

(63) Continuation of application No. 15/681,288, filed on Aug. 18, 2017, now Pat. No. 11,003,344.

(Continued)

(51) Int. Cl.
*G06F 3/04847* (2022.01)
*G06T 11/60* (2006.01)
(Continued)

(52) U.S. Cl.
CPC ....... *G06F 3/04847* (2013.01); *G01C 21/367* (2013.01); *G06F 3/0482* (2013.01);
(Continued)

(58) Field of Classification Search
CPC .... G06F 16/2379; G06F 16/287; G06F 16/29; G06F 2203/04806; G06F 3/0482;
(Continued)

(56) References Cited

U.S. PATENT DOCUMENTS 8,274,524 B1    9/2012  Cornell et al.
8,681,176 B1 *  3/2014  Maurer ................ G01C 21/367
                                                            701/457

(Continued)

OTHER PUBLICATIONS

Amy Lee Walton, "Designing the Blueprint style in Mapbox", Nov. 5, 2015, Mapbox—maps for developers, pp. 8 (Year: 2015).*

(Continued)

*Primary Examiner* — Chau T Nguyen
(74) *Attorney, Agent, or Firm* — Fenwick & West LLP

(57) ABSTRACT

A process, and corresponding system for performing the process, is described for editing and representing property values for a digital map. The process retrieves electronic map data from a style sheet corresponding to a vector map tile set for a digital map and displays map layer styles in a property editor panel, where each map style layer references a portion of the data and one or more visual style rules to apply to the portion. The process also displays a visual map with the map layer styles applied. Upon receiving selection of one or more map style layers from the plurality of map style layers, the process displays style layer properties and values corresponding to each. The process renders in the visual map only the selected one or more style layers marked as visible. As edits are made in the property editor panel, the visual map is updated to reflect the changes.

20 Claims, 10 Drawing Sheets

Related U.S. Application Data

(60) Provisional application No. 62/376,868, filed on Aug. 18, 2016.

(51) Int. Cl.
| | | |
|---|---|---|
| *G06T 11/20* | (2006.01) | |
| *G06F 3/04845* | (2022.01) | |
| *G06F 3/0482* | (2013.01) | |
| *G06F 16/29* | (2019.01) | |
| *G06F 16/28* | (2019.01) | |
| *G06F 16/23* | (2019.01) | |
| *G01C 21/36* | (2006.01) | |
| *G09B 29/00* | (2006.01) | |
| *G06F 3/0486* | (2013.01) | |

(52) U.S. Cl.
CPC ........ *G06F 3/0486* (2013.01); *G06F 3/04845* (2013.01); *G06F 16/2379* (2019.01); *G06F 16/287* (2019.01); *G06F 16/29* (2019.01); *G06T 11/206* (2013.01); *G06T 11/60* (2013.01); *G09B 29/003* (2013.01); *G06F 2203/04806* (2013.01); *G06T 2200/24* (2013.01)

(58) Field of Classification Search
CPC ............. G06F 3/04845; G06F 3/04847; G06F 3/0486; G06T 11/206; G06T 11/60; G06T 2200/24; G09B 29/003; G01C 21/367
See application file for complete search history.

(56) References Cited

U.S. PATENT DOCUMENTS

| | | | |
|---|---|---|---|
| 8,937,627 B1 | 1/2015 | Otero et al. | |
| 9,111,380 B2 | 8/2015 | Piemonte et al. | |
| 9,563,450 B1 | 2/2017 | Totale et al. | |
| 10,444,940 B2 | 10/2019 | Cervelli et al. | |
| 10,444,941 B2 | 10/2019 | Cervelli et al. | |
| 2002/0091758 A1 | 7/2002 | Singh et al. | |
| 2002/0175948 A1 | 11/2002 | Nielsen et al. | |
| 2005/0231392 A1 | 10/2005 | Meehan et al. | |
| 2007/0219938 A1 | 9/2007 | Boersma et al. | |
| 2008/0231643 A1 | 9/2008 | Fletcher et al. | |
| 2009/0015596 A1 | 1/2009 | Fuchs et al. | |
| 2011/0214050 A1 | 9/2011 | Stambaugh | |
| 2011/0289077 A1 | 11/2011 | Wade et al. | |
| 2013/0124980 A1 | 5/2013 | Hudson et al. | |
| 2013/0147794 A1 | 6/2013 | Lee et al. | |
| 2013/0321450 A1* | 12/2013 | Hultquist | G01C 21/367 345/619 |
| 2013/0339891 A1 | 12/2013 | Blumenberg et al. | |
| 2014/0340421 A1 | 11/2014 | Otero et al. | |
| 2014/0354629 A1 | 12/2014 | Adlers et al. | |
| 2014/0365935 A1 | 12/2014 | Moha et al. | |
| 2015/0170385 A1 | 6/2015 | Appleton et al. | |
| 2015/0186414 A1 | 7/2015 | Jones et al. | |
| 2015/0262399 A1 | 9/2015 | Popescu | |
| 2015/0310360 A1* | 10/2015 | Currin | G06F 30/13 705/7.12 |
| 2015/0310652 A1 | 10/2015 | Dobson | |
| 2016/0070451 A1 | 3/2016 | Kim et al. | |
| 2016/0102983 A1 | 4/2016 | Javed et al. | |
| 2017/0039765 A1 | 2/2017 | Zhou et al. | |
| 2017/0052747 A1* | 2/2017 | Cervelli | G06T 11/60 |
| 2017/0228899 A1 | 8/2017 | Witriol et al. | |
| 2017/0308549 A1 | 10/2017 | Sims et al. | |
| 2018/0189250 A1 | 7/2018 | Lee et al. | |
| 2019/0087442 A1 | 3/2019 | Zhang et al. | |

OTHER PUBLICATIONS

ArcMap, "Symbolizing Data with ArcMap," Geography 205 Class Material by T Millett, at <https://www.mtholyoke.edu/courses/tmilletUcourse/geog205/files/Symbolizing_Data. Pdf, Apr. 10, 2016, pp. 133-166.

Avenza Systems, "Using MAP Themes to Automatically style CanVec+ Data on Import in MAPublisher," posted on Dec. 3, 2014, Retrieved from the internet <URL:https://www.avenza.com/resources/blog/2014/12/03/using-map-themes-to-automaticallystyle-canvec-data-on-import-in-mapublisher/ (Year: 2014)>.

Ekenes, K. "Using Smart Mapping in Custom Web Apps." Esri.com, ArcGIS Blog, Mar. 28, 2016, 16 pages, [Online] [Retrieved Dec. 19, 2020], Retrieved from the Internet <https://www.esri.com/arcgis-blog/products/mapping/mapping/using-smart-mapping-in-custom-web-apps/>.

Field, K. "Using scale visibility ranges for symbology in ArcGIS Online web maps," at https://www.esri.com/arcgis-blog/products/arcgis-online/mapping/using-scale-visibility-ranges-for-symbology-in-arcqis-online-web-maps, Dec. 12, 2011, pp. 1-7.

MacWright, T. "Introducing Mapbox Studio," Mapbox, Nov. 18, 2015, 11 pages.

Oracle. "28: Using Map Components." Oracle Help Center, Jul. 2015, 65 pages, [Online] [Retrieved Dec. 19, 2020], Retrieved from the Internet Archive <https://web. archive.org/web/20150726035657/https://docs.oracle. com/middleware/1213/adf/develop-faces/dvt-maps.htm>.

Scott, M. "ESRI WebGIS Highlights of What's New and the Road Ahead," West Virginia GIS Conference, at https://www.esri.com/arcgis-blog/products/arcgis-online/mapping/using-scale-visibility-ranges-for-symbology-in-arcqis-online-web-maDs, May 5, 2016, pp. 1-68.

Sheldon, B., "Ramping Up in Studio," Mapbox Studio, <<https://blog.mapbox.com/ramping-up-in-studio-7fla934270d1>>, Feb. 4, 2016, 3 pages.

United States Office Action, U.S. Appl. No. 15/681,286, filed May 29, 2020, 29 pages.

United States Office Action, U.S. Appl. No. 15/681,286, filed Nov. 15, 2019, 31 pages.

United States Office Action, U.S. Appl. No. 15/681,286, filed Jul. 11, 2019, 28 pages.

United States Office Action, U.S. Appl. No. 15/681,290, filed May 17, 2018, 14 pages.

United States Office Action, U.S. Appl. No. 15/681,284, filed Jan. 18, 2019, 56 pages.

United States Office Action, U.S. Appl. No. 15/681,286, filed Jan. 11, 2019, 24 pages.

United States Office Action, U.S. Appl. No. 15/681,290, filed Dec. 14, 2018, 14 pages.

United States Office Action, U.S. Appl. No. 16/177,190, filed Jan. 27, 2020, 62 pages.

United States Office Action, U.S. Appl. No. 16/177,190, filed Dec. 24, 2020, 43 pages.

United States Office Action, U.S. Appl. No. 16/177,190, filed Jul. 8, 2020, 31 pages.

United States Office Action, U.S. Appl. No. 16/530,707, filed Oct. 30, 2019, 23 pages.

Walton, A. "Designing the Blueprint style in Mapbox Studio", Mapbox, Nov. 5, 2015, https://blog.maobox.com/designing-the-blueprint-style-in-mapbox-studio-2e41e0c45141, 8 pages.

United States Office Action, U.S. Appl. No. 15/681,288, filed Oct. 7, 2019, 10 pages.

United States Office Action, U.S. Appl. No. 15/681,288, filed May 13, 2020, 17 pages.

United States Office Action, U.S. Appl. No. 15/681,288, filed Aug. 7, 2020, 16 pages.

United States Office Action, U.S. Appl. No. 16/530,707, filed Feb. 28, 2020, 31 pages.

United States Office Action, U.S. Appl. No. 16/571,045, filed Feb. 3, 2020, 16 pages.

* cited by examiner

MODIFYING STYLE LAYER PROPERTIES OF A DIGITAL MAP

BENEFIT CLAIM

This application is a continuation of application Ser. No. 15/681,288, filed Aug. 18, 2017, which claims the benefit under 35 U.S.C. § 119(e) of provisional application 62/376,868, filed Aug. 18, 2016, the entire contents of which are hereby incorporated by reference for all purposes as if fully set forth herein. This application also is related to non-provisional applications: Ser. No. 15/681,286, entitled "Providing Visual Selection of Map Data in a Digital Map," Ser. No. 15/681,284, entitled "Representation of Digital Map Styling Properties Across Zoom Levels," and Ser. No. 15/681,290, entitled "Providing Graphical Indication of Label Boundaries in Digital Maps," each of which were filed on Aug. 18, 2017, and the entire contents of each is hereby incorporated by reference as if fully set forth herein.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

While digital maps and graphical user interfaces for digital maps have entered wide use, creating such maps and interfaces is difficult using pre-existing software tools. Editing and authoring programs for creating digital map templates, colors, and features has been complex and required many manual operations. In particular, processes for customizing digital maps, or preparing digital maps in a manner that can adapt to other applications that use the maps, has been difficult or inconvenient. Therefore, there is a need for more flexible, comprehensive and convenient computer-based techniques for creating, modifying and manipulating digital maps and graphical user interfaces for digital computer display devices that display maps.

SUMMARY

As described herein, electronic map data is divided into a plurality of vector map tiles at a plurality of zoom levels, wherein each map tile corresponds to a portion of a geographic map. The map tiles are rendered when requested by a client, and each map tile is rendered based on one or more map styles, which defines the visual appearance of an electronic map, such as what map data to display in the electronic map, what order to render the data in, and how to style the data when it is rendered.

A map style comprises one or more map style layers, each of which may include a reference to a portion of electronic map data and one or more visual style rules to be applied to the portion of electronic map data. Map editing instructions are programmed or configured to cause display, in a graphical user interface of a computer display device and in association with a digital map, of one or more style layer properties of the digital map.

A process, and corresponding system for performing the process, is described herein for editing and representing property values for a digital map. The process retrieves electronic map data from a style sheet corresponding to a vector map tile set for a digital map and displays map layer styles in a property editor panel, where each map style layer references a portion of the electronic map data and one or more visual style rules to apply to the portion. The process also displays a visual map with the map layer styles applied. Upon receiving selection of one or more map style layers from the plurality of map style layers, the process displays style layer properties and values corresponding to each. The process renders in the visual map only the one or more selected style layers marked as visible. As edits are made in the property editor panel, the visual map is updated to reflect the changes.

DETAILED DESCRIPTION

Figure 1A:
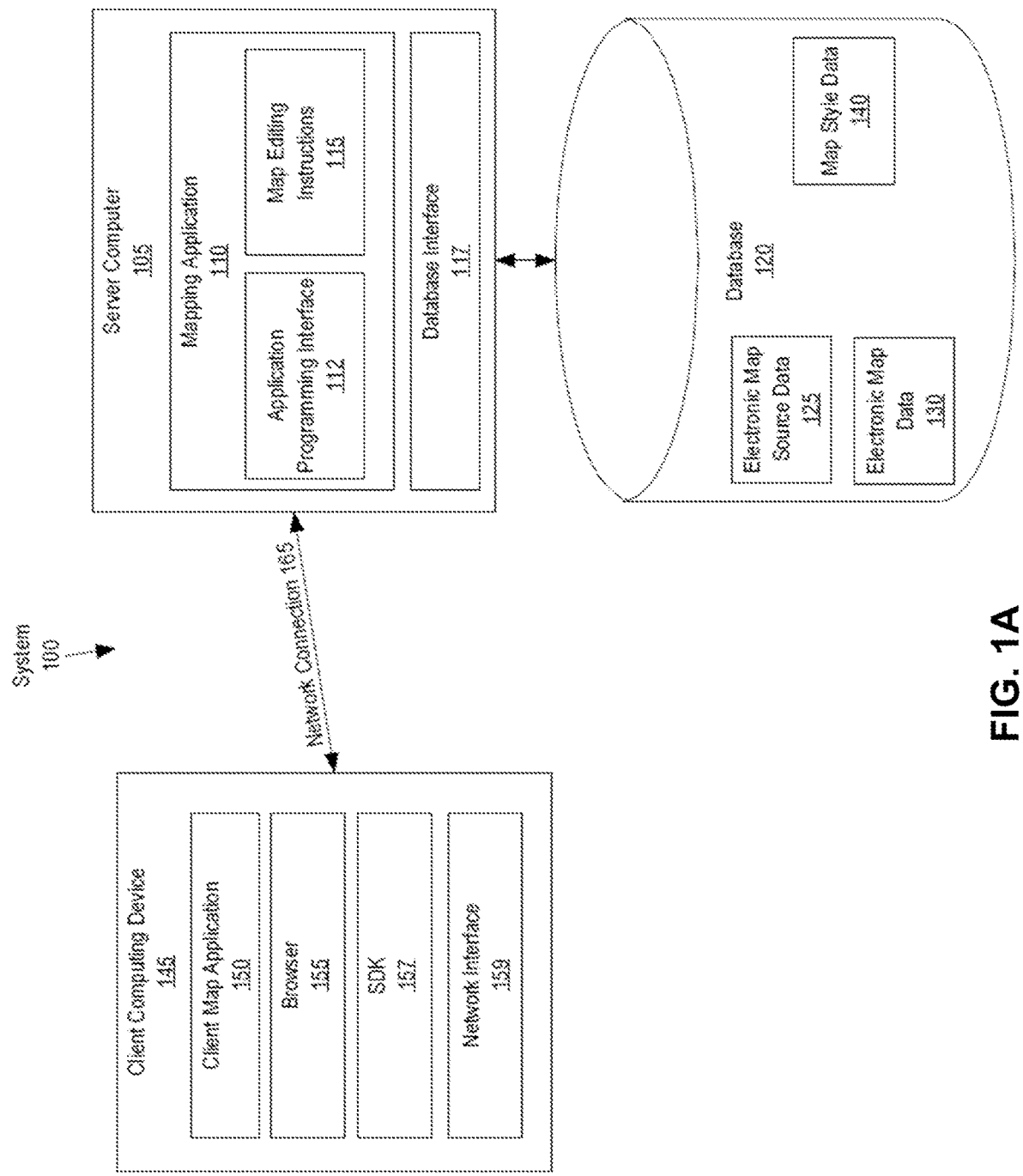
FIG. 1A illustrates an example computer system in which the techniques described herein may be practiced, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

System Overview

FIG. 1A illustrates an example computer system in which the techniques described may be practiced, according to one embodiment.

In an embodiment, a computer system 100 comprises a plurality of components that may be implemented at least partially by hardware at one or more computing devices, such as one or more hardware processors executing stored program instructions stored in one or more memories for performing the functions that are described herein. In other words, in an embodiment, all functions described herein are intended to indicate operations that are performed using programming in a special-purpose computer or general-purpose computer, in various embodiments. FIG. 1A illustrates only one of many possible arrangements of components configured to execute the programming described herein. Other arrangements may include fewer or different components, and the division of work between the components may vary depending on the arrangement.

FIG. 1A illustrates a client computing device 145 that is coupled via a network connection 165 to a server computer 105, which is coupled to a database 120. The server computer comprises a mapping application 110, an application programming interface (API) 112, map editing instructions 115, and a database interface 117. The database 120 comprises electronic map source data 125, electronic map data 130, and map style data 140. The client computing device 145 comprises a client map application 150, browser 155, and wireless network interface 159.

In one embodiment, client computing device 145 is any computing device, such as a work station, personal computer, general purpose computer, laptop, hand-held computer, wearable computer, cellular or mobile phone, portable digital assistant (PDA), tablet computer, and the like. Although a single client computing device is depicted in FIG. 1A, any number of client computing devices may be present. Each client computing device 145 is communicatively connected to server computer 105 through network connection 165 which comprises any combination of a LAN, a WAN, one or more internetworks such as the public Internet, a cellular network, or a company network.

Client computing device 145 also includes network interface 159, which is used by the client computing device 145 to communicate with other devices. In particular, network interface 159 is used to establish network connection 165 to server computer 105. Network interface 159 may use Ethernet, WiFi, WiMAX, Bluetooth, ZigBee, cellular standards, or others.

Client computing device 145 also includes other hardware elements, such as one or more input devices, memory, processors, and the like, which are not depicted in FIG. 1A. Client computing device 145 also includes applications, software, and other executable instructions to facilitate various aspects of embodiments described herein. These applications, software, and other executable instructions may be installed by a user, owner, manufacturer, or other entity related to the client computing device.

In one embodiment, client computing device 145 includes client map application 155 which is software that displays, uses, supports, or otherwise provides electronic mapping functionality as part of the application or software. Client map application 155 may be any type of application, such as a taxi service, a video game, a chat client, a food delivery application, etc. In an embodiment, client map application 155 obtains electronic mapping functions through SDK 157, which may implement functional calls, callbacks, methods, or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

In one embodiment, client computing device 145 includes browser 155. Browser 155 is a computer application that may request and execute instructions received from web servers to generate complex user interfaces that are presented to a user through one or more devices, such as a display or speakers. In response to input from a user, such as a mouse click indicating that the user selected an object defined in the instructions, such as a button or a text box, a browser may send a request based on the selected object to the web server. The request may be a request for data or include data to be processed by the web server. In an embodiment, browser 155 may receive instructions from server computer 105 to generate a user interface of a map editing program through which a user may create and modify map styles. Additionally or alternatively, client computing device 145 may include a map editing application or software that provides map editing functions as part of the application or software.

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1A shows a single element, the server computer 105 broadly represents one or more multiple server computers, such as a server cluster, and the server computer 105 may be located in one or more physical locations. Server computer 105 may also represent one or more virtual computing instances that execute using one or more computers in a datacenter such as a virtual server farm.

Server computer 105 is communicatively connected to database 120 and client computer device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 117, to facilitate various aspects of embodiments described herein.

In one embodiment, database interface 117 is a programmatic interface such as JDBC or ODBC for communicating with database 120. Database interface 117 may communicate with any number of databases and any type of database, in any format. Database interface 117 may be a piece of customer software created by an entity associated with mapping application 110, or may be created by a third party entity in part or in whole.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1A, database 120 may span multiple devices located in one or more physical locations. For example, database 120 may include one or nodes located at a data warehouse(s). Additionally, in one embodiment, database 120 may be located on the same device(s) as server computer 105. Alternatively, database 120 may be located on a separate device(s) from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, map tile filter 135, and map style data 140. These datasets may be stored as columnar data in a relational database or as flat files.

In one embodiment, electronic map source data 125 is raw digital map data that is obtained, downloaded, or received from a variety of sources. The raw digital map data may include satellite images, digital street data, building or place data, or terrain data. Example sources include National Aeronautics and Space Administration (NASA), United States Geological Survey (USGS), and DigitalGlobe. Raw digital map data may also be defined by a user and uploaded to the server computer. Electronic map source data 125 may be updated at any suitable interval, and may be stored for any amount of time. Once obtained or received, electronic map source data 125 is used to generate electronic map data 130.

In one embodiment, electronic map data 130 is digital map data that is provided, either directly or indirectly, to client map applications, such as client map application 155, using an API. Electronic map data 130 is based on electronic map source data 125. Specifically, electronic map source data 125 is processed and organized as a plurality of vector map tiles which may be subject to map style data to impose different display styles. Electronic map data 130 may be updated at any suitable interval, and may include additional information beyond that derived from electronic map source data 125.

In an embodiment, electronic map data is divided into a plurality of vector map tiles at a plurality of zoom levels, wherein each map tile corresponds to a portion of a geographic map. For example, a map tile may correspond to a square area of a geographic map at a particular zoom level, or an area of a pre-defined size and location within a geographic map. In an embodiment, the portion of electronic map data within each map tile may be organized in a compact, structured format, such as the Mapbox Vector Tile Specification format, by Mapbox, Inc., San Francisco, Calif. Additionally or alternatively, electronic map data 130 may comprise a plurality of map tile sets. A first set of map tiles may include electronic map data derived from a first set of electronic map source data, while a second set of map tiles may include electronic map data derived from a second set of electronic map source data.

In an embodiment, a map tile contains data describing map geometries, such as points, lines, and polygons, of features on the map. Additionally or alternatively, the map tile contains metadata, such as road names, place names, house numbers, feature types, and other properties. For example, electronic map data in a vector map tile corresponding to a portion of a geographic map may include geometry data representing roads, buildings, water, parks, and etc. to be depicted within the portion of the geographic map, as well as geometries for suggested placement of labels and other cartographic features. The map tile may also include metadata corresponding to each feature, such as names that can be rendered as labels on a digital map. Additionally or alternatively, the metadata includes data indicating the portion of the geographic map that the map tile corresponds to. For example, the metadata may include data indicating one or more coordinates of the map tile or one or more boundaries of the map tile. Additionally or alternatively, the metadata includes data indicating the zoom level at which that map tile is to be displayed.

In an embodiment, electronic map data is further organized into a plurality of data layers. Electronic map data may describe a plurality of map features, such as buildings, water, roads, etc. The map features may be grouped into the plurality of data layers. For example, a "Road" data layer may include map features such as streets, bridges, freeways, paths, and etc. As another example, a "Water" data layer may include map features such as rivers, lakes, oceans, canals, and etc.

In an embodiment, map tiles are used by program libraries and SDKs, such as SDK 157, as part of displaying maps on a mobile computing device or a browser. A map application or a browser may request one or more map tiles and process the map tiles to cause display of a visual map.

In an embodiment, map tiles are rendered when requested by a client, like a web browser or a mobile application. Rendering may be performed by a rendering library of a client map application or on a server computer. Example rendering libraries include, but are not limited to, Mapbox GL JS, available from Mapbox, Inc., San Francisco, Calif., the Mapbox iOS SDK, Mapbox Android SDK, the Mapbox GL native renderer, or through a Mapbox API.

In an embodiment, a map tile is rendered based on a map style. Each map style of a plurality of map styles can be used to render the same map tile. In other words, the same portion of electronic map data may be displayed in a variety of visual styles. For example, in one map application, map tiles may be displayed with dark colors while in a second map application, map tiles may be displayed with light colors. Additionally or alternatively, the electronic map data required may differ based on map style. For example, in one map application, roads within a map tile may be displayed while buildings are not displayed. In another map application, landscape and rivers may be displayed while roads are not displayed.

In one embodiment, map style data 140 is digital data that defines one or more visual map styles for electronic maps. May style data 140 may comprise a plurality of map styles. A map style defines the visual appearance of an electronic map, such as what map data to display in the electronic map, what order to render the data in, and how to style the data when it is rendered. In an embodiment, a map style may include information including, but not limited to, references to portions of electronic map data 130, map images, fonts, and rules specifying how the portions of electronic map data 130 should be styled when rendering a digital map, such as colors, line styles, line thickness, and etc.

In an embodiment, each map style may be stored as a document. For example, a map style may be stored as a JSON object that adheres to a particular style format specification. A map style may be generated using a map editing program or written independently and uploaded to a server computer.

In an embodiment, a map style comprises one or more map style layers. Each map style layer may include a reference to a portion of electronic map data and one or more visual style rules to be applied to the portion of electronic map data. In an embodiment, the reference to the portion of electronic map data specifies a particular map data source for the maps style layer. For example, the map style may specify a particular map tile set from a plurality of map tile sets as the map data source for the style layer. Additionally or alternatively, the map style layer may specify a particular data layer within the map tile set to associate with the style layer. For example, a style layer may specify visual style rules for a "Water" data layer of a set of map tiles.

In an embodiment, style layer data may include data indicating a style layer type for a map style layer. A map style layer may be a particular map style layer type, such as lines, polygons, symbols, circles, 3D polygons, and images. Additionally or alternatively, the style layer data may specify property values for one or more style layer properties associated with the style layer type. The style layer data may include data indicating property values to associate with each style layer property. In an embodiment, a property value may be a static value. Additionally or alternatively, the property value may be a dynamic value. For example, the property value may be a zoom level dependent value, such as a function that outputs a property value based on an input zoom level.

Each style layer type has a set of properties for which values may be specified. For example, a line style layer type may include style layer properties such as line width, line color, line style (solid, dotted, dashed), line cap style, line positioning, etc. As another example, a polygon style layer type may include style layer properties such as fill color, fill pattern, opacity, anti-aliasing, fill outline color, polygon positioning, etc.

In an embodiment, mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: receiving map tile requests from client computing devices, sending electronic map data to client computing devices, receiving map style data 140 from map editing applications, receiving electronic map source data 125 from data providers, processing electronic map source data 125 to generate electronic map data 130, and any other aspects of embodiments described herein. Mapping application 110 includes map editing instructions 115 which are programmed or configured to receive and store modified map style data. Additionally or alternatively, map editing instructions 115 may include instructions to perform the process as detailed in FIG. 9.

In one embodiment, map editing instructions 115 are programmed or configured to cause display, in a graphical user interface of a computer display device and in association with a digital map, one or more style layer properties of the digital map, wherein each style layer comprises a plurality of style layer properties. Map editing instructions 115 may be further programmed or configured to receive input specifying a particular style layer of the one or more style layers and display style layer properties of the particular style layer. Map editing instructions 115 may be further programmed or configured to receive input specifying an updated property value for a particular style layer property, assign the updated property value to the particular style layer property, and store an updated map style in map style data 140 that includes the updated property value.

Additionally or alternatively, map editing instructions 115 may include instructions to cause re-display of the digital map in the graphical user interface based on the updated property value for the particular style layer property.

Additionally or alternatively, map editing instructions 115 may include instructions to receive input specifying a property type and cause display of one or more style layer properties of the specified property type.

In an embodiment, map editing instructions 115 may include instructions for causing display of a graphical user interface of a map editing program at client computing devices. Map editing instructions 115 may generate and send instructions to browser 155 to generate the graphical user interface. Additionally or alternatively, map editing instructions 115 may provide data to a map editing application or other software that provides map editing functions as part of the application or software. For example, map editing instructions may send map style data to a map editing application, receive new or updated map style data, and store received map style data to map style data 140.

A map editing program may be used to design a map to a user's specifications by allowing a user to select or upload map data, add custom fonts and images, or define and edit map styles, among other features. In an embodiment, a map editing program includes a map style editor creating custom map styles to a user's specifications. The map style editor may include a graphical user interface through which a user can define a custom map style or edit existing map styles.

Additionally or alternatively, the map style editor may include a visual map. The visual map may be displayed in conjunction with one or more map style layer properties. In an embodiment, the visual map is rendered based on the map style being edited in the map style editor. As changes are made to style layer properties, the visual map may be updated to reflect the changes. For example, if a user specifies a new width property value for roads, the map style editor may automatically re-display the visual map and render any roads shown within the map area using the new width property value.

According to one embodiment, the techniques described herein are implemented by one or more special-purpose computing devices. For example, the server computer 105 and client computing device 145 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 1B:
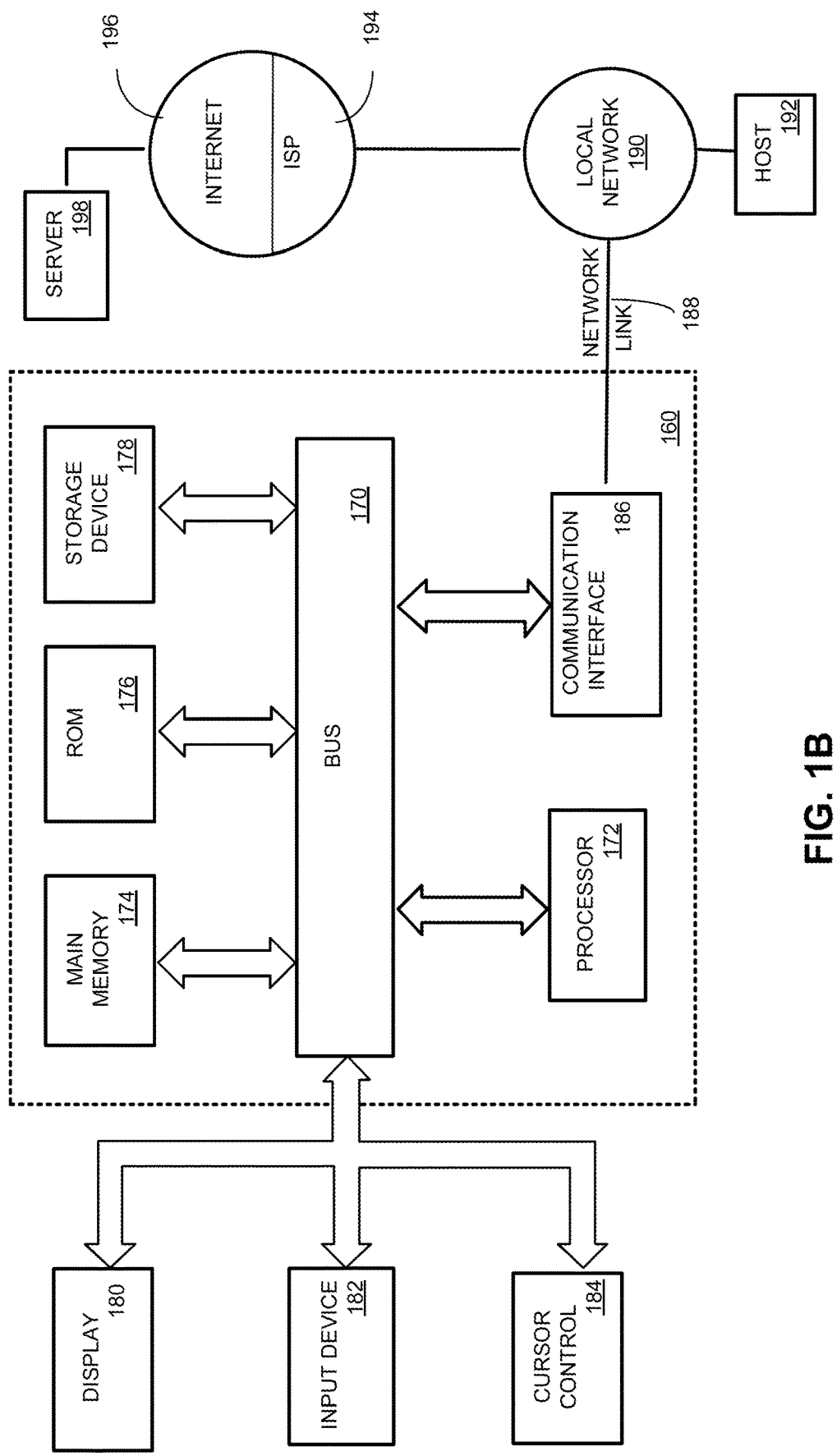
FIG. 1B illustrates a computer system upon which an embodiment may be implemented.

For example, FIG. 1B is a block diagram that illustrates a computer system 160 upon which an embodiment of the invention may be implemented. Computer system 160 includes a bus 170 or other communication mechanism for communicating information, and a hardware processor 172 coupled with bus 170 for processing information. Hardware processor 172 may be, for example, a general purpose microprocessor.

Computer system 160 also includes a main memory 174, such as a random access memory (RAM) or other dynamic storage device, coupled to bus 170 for storing information and instructions to be executed by processor 172. Main memory 174 also may be used for storing temporary variables or other intermediate information during execution of instructions to be executed by processor 172. Such instructions, when stored in non-transitory storage media accessible to processor 172, render computer system 160 into a special-purpose machine that is customized to perform the operations specified in the instructions.

Computer system 160 further includes a read only memory (ROM) 176 or other static storage device coupled to bus 170 for storing static information and instructions for processor 172. A storage device 178, such as a magnetic disk, optical disk, or solid-state drive is provided and coupled to bus 170 for storing information and instructions.

Computer system 160 may be coupled via bus 170 to a display 180, such as a cathode ray tube (CRT), LCD screen, LED screen, or touch screen, for displaying information to a computer user. An input device 182, which may include alphanumeric and other keys, buttons, a mouse, a touchscreen, or other input elements, is coupled to bus 170 for communicating information and command selections to processor 172. In some embodiments, the computer system 160 may also include a cursor control 184, such as a mouse, a trackball, or cursor direction keys for communicating direction information and command selections to processor 172 and for controlling cursor movement on display 180. The cursor control 184 typically has two degrees of freedom in two axes, a first axis (e.g., x) and a second axis (e.g., y), that allows the device to specify positions in a plane.

Computer system 160 may implement the techniques described herein using customized hard-wired logic, one or more ASICs or FPGAs, firmware and/or program logic which in combination with the computer system causes or programs computer system 160 to be a special-purpose machine. According to one embodiment, the techniques herein are performed by computer system 160 in response to processor 172 executing one or more sequences of one or more instructions contained in main memory 174. Such instructions may be read into main memory 174 from another storage medium, such as storage device 178. Execution of the sequences of instructions contained in main memory 174 causes processor 172 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 178. Volatile media includes dynamic memory, such as main memory 174. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 170. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 172 for execution. For example, the instructions may initially be carried on a magnetic disk or solid-state drive of a remote computer. The remote computer can load the instructions into its dynamic memory and send the instructions over a telephone line using a modem. A modem local to computer system 160 can receive the data on the telephone line and use an infra-red transmitter to convert the data to an infra-red signal. An infra-red detector can receive the data carried in the infra-red signal and appropriate circuitry can place the data on bus 170. Bus 170 carries the data to main memory 174, from which processor 172 retrieves and executes the instructions. The instructions received by main memory 174 may optionally be stored on storage device 178 either before or after execution by processor 172.

Computer system 160 also includes a communication interface 186 coupled to bus 170. Communication interface 186 provides a two-way data communication coupling to a network link 188 that is connected to a local network 190. For example, communication interface 186 may be an integrated services digital network (ISDN) card, cable modem, satellite modem, or a modem to provide a data communication connection to a corresponding type of telephone line. As another example, communication interface 186 may be a local area network (LAN) card to provide a data communication connection to a compatible LAN. Wireless links may also be implemented. In any such implementation, communication interface 186 sends and receives electrical, electromagnetic or optical signals that carry digital data streams representing various types of information.

Network link 188 typically provides data communication through one or more networks to other data devices. For example, network link 188 may provide a connection through local network 190 to a host computer 192 or to data equipment operated by an Internet Service Provider (ISP) 194. ISP 194 in turn provides data communication services through the world wide packet data communication network now commonly referred to as the "Internet" 196. Local network 190 and Internet 196 both use electrical, electromagnetic or optical signals that carry digital data streams. The signals through the various networks and the signals on network link 188 and through communication interface 186, which carry the digital data to and from computer system 160, are example forms of transmission media.

Computer system 160 can send messages and receive data, including program code, through the network(s), network link 188 and communication interface 186. In the Internet example, a server 198 might transmit a requested code for an application program through Internet 196, ISP 194, local network 190 and communication interface 186.

The received code may be executed by processor 172 as it is received, and/or stored in storage device 178, or other non-volatile storage for later execution.

Figure 2:
FIG. 2 illustrates a map style editor according to an embodiment.

FIG. 2 illustrates an example graphical user interface of a map style editor. The map style editor includes style layer list 210 and visual map 230.

In an embodiment, style layer list 210 displays a list of style layers and style layer groups for the selected map style. Additionally or alternatively, the style layer list 210 indicates the number of layers within each layer group next to the name of the layer group. In the illustrated example, map style layer list 210 lists a plurality of style layers and style layer groups for a map style titled "Bright."

Additionally or alternatively, a user can create, sort, group, and delete layers using the map style editor. In the illustrated example, style layer list 210 includes a toolbar comprising a new layer button, a duplicate layer button 202, a group/ungroup layers button 204, a show/hide layers button 206, and a delete layer button 208. The new layer button causes the map style editor to display a dialog for specifying map data styled by the map style layer, such as a source map tile set, style layer filters, and other information for creating a new map style layer. The duplicate layer button 202 allows a user to copy a style layer or a group of style layers. The group/ungroup layers button 204 groups multiple selected layers or ungroups a group of style layers. The show/hide layers button 206 shows or hides one or more selected style layers on the map. The delete layer button 208 deletes one or more selected style layers from the map style.

Visual map 230 is a visual representation of a particular area of a digital map. In an embodiment, one or more map tiles corresponding to the particular area of the digital map are requested and processed in order to render the visual map. Visual map 230 may be updated or re-redisplayed as a user pans or zooms the map. Additionally or alternatively, visual map 230 may be rendered based on the selected map style that is being edited in the map style editor. When changes are made to the map style, the map style editor may update or re-display visual map 230. In other words, visual map 230 may provide a real-time representation of how digital maps will look if rendered using the selected map style.

In an embodiment, the map style editor displays a list of style layer properties and property values for one or more style layers. A user may view or modify the property value assigned to one or more style layer properties using the map style editor.

Figure 3:
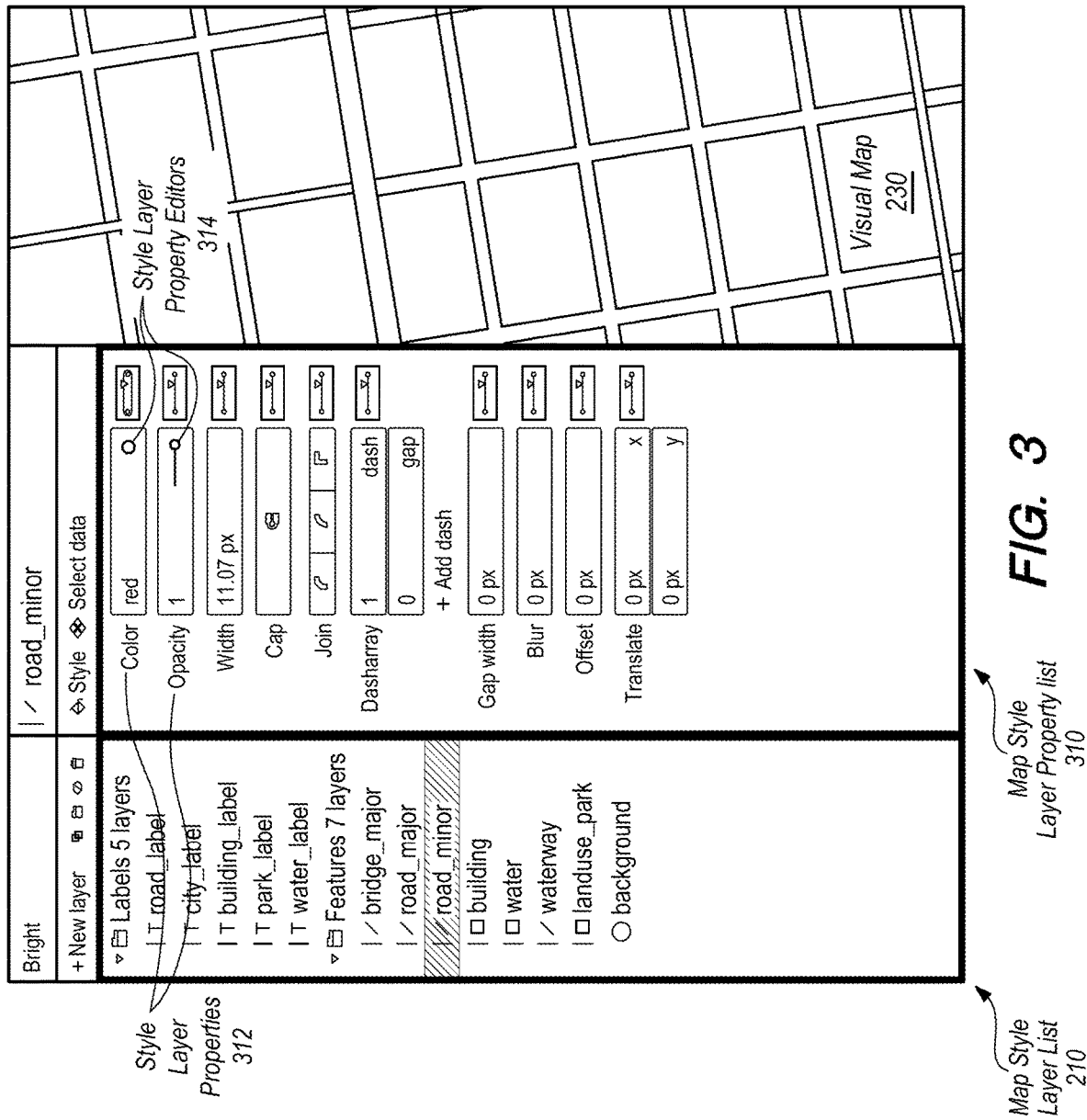
FIG. 3 illustrates a map style layer property list of a map style editor, according to an embodiment.

In an embodiment, selecting one or more style layers in the style layer list 210 allows a user to view and edit the properties for the selected layer(s). FIG. 3 illustrates an example map style layer property list of the map style editor.

In the illustrated example, the "road_street" style layer is selected in style layer list 210. Map style layer property list 310 is displayed in the graphical user interface. Style layer property list 310 displays style layer properties that are associated with a selected style layer. Additionally or alternatively, style layer property list 310 displays the property value assigned to each style layer property. In the present example, style layer property list 220 includes a plurality of style layer properties for the "road_street" style layer, such as the ones indicated by the label style layer properties 222.

In an embodiment, style layer property list 310 includes a property editor for one or more style layer properties, such as the style layer property editors 314 indicated for style layer properties 312. In the example illustrated in FIG. 3, the Color, Pattern, and Opacity style layer properties each have a corresponding text field. The text fields indicate the current value of each style layer property. Selecting a property editor may bring up a graphical editor where the user can select a value for the property, such as a color selection panel for the Color property. A user may also edit the property value by typing or pasting text into the text field, or adjust a numerical value using arrow keys. Other properties may have buttons or other types of user interface components that allow a user to select or specify a property value.

Figure 4:
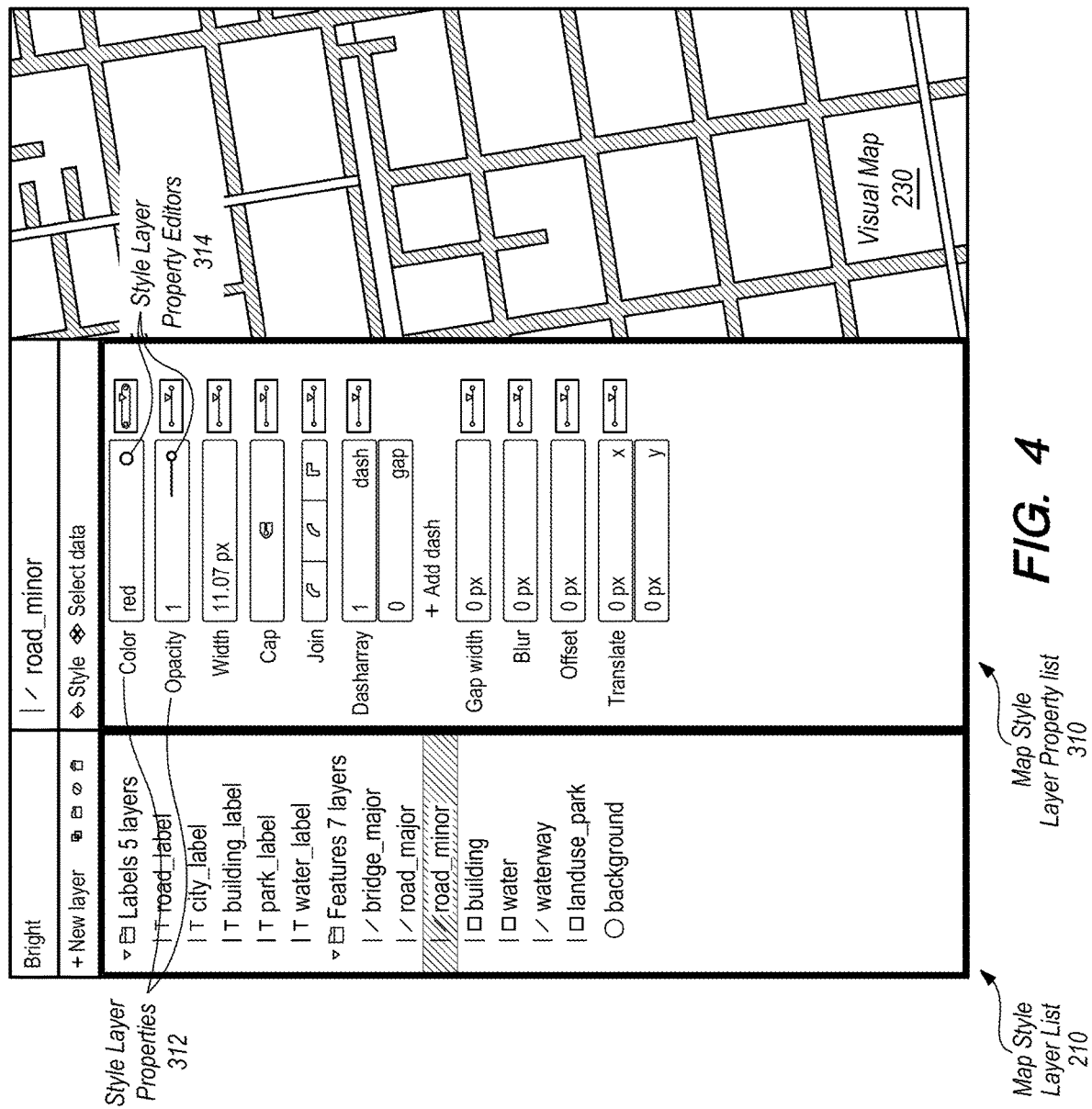
FIG. 4 illustrates a map style editor after receiving a property value from a user.

In an embodiment, if a user modifies a value for a property, visual map 230 is re-displayed to reflect the updated property value. Additionally or alternatively, the property editor may be updated to display the updated property value. FIG. 4 illustrates the visual map of the map style editor after a property value is modified. In FIG. 4, the property value for the "Color" property has been set to "#000" (black). Property editor 314 displays the updated property value. Additionally, visual map 230 is updated to display streets in black instead of white.

In an embodiment, selecting a property editor may cause the map style editor to display a graphical editor where the user can select an existing property value. An existing property value may include other values assigned to the same style property in other style layers. For example, if a line color property is selected, the map style editor may display a list of line colors used in other style layers. Additionally or alternatively, the map style editor may display a list of values for other properties of a similar value type. For example, selecting a style property with a color property value may cause the map style editor to display a list of all colors used in other style layers of the map, such as other line colors, fill colors, text color, and etc.

Figure 5:
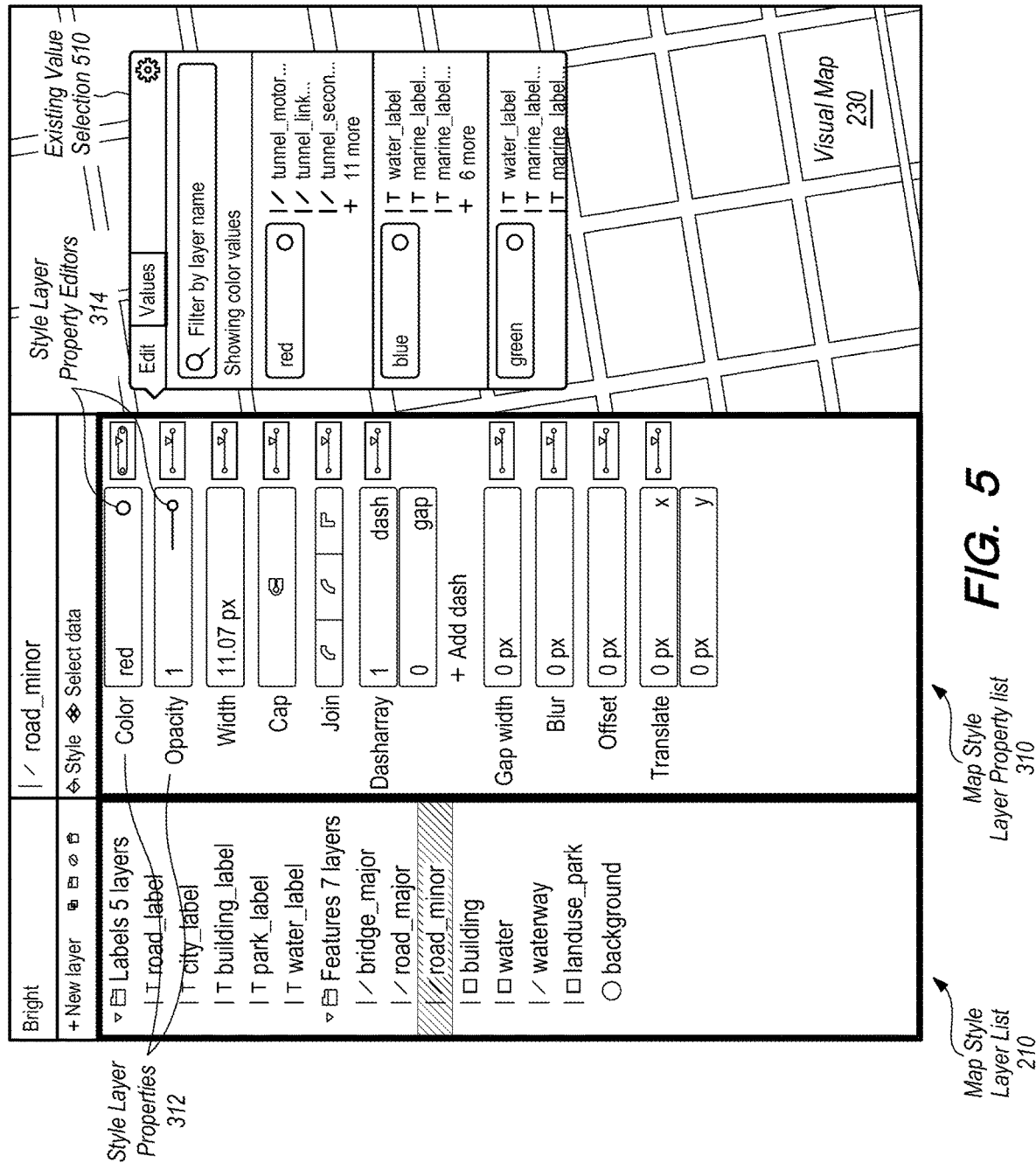
FIG. 5 illustrates a existing property value selection editor of a map style editor, according to an embodiment.

FIG. 5 illustrates an example existing property value selection editor for the map style editor. The "Color" property is selected to display existing value selection editor 510. Existing value selection editor 510 comprises a plurality of property values 512 and corresponding style layer lists 514. Property values 512 are property values from other map style layers. In the illustrated example, the "Color" property for "road_street" map style layer is selected, so color values used in other map style layers are displayed. Style layer lists 514 list the style layers that have the particular property value for the color property. Selecting a property value from property values 512 sets the value for the selected style property.

In an embodiment, if a layer group is selected, editing a style layer property sets the property value for every style layer within the style layer group. If style layers within a style layer group have different values for the same style layer property, the map style editor may display a list of the different property values and let the user select a property value to apply to the style layer property for all style layers in the style layer group. In an embodiment, only style layers of the same style layer type—for example, symbols, circles, fills, lines, backgrounds, fill extrusions, raster layers, or other layer types—can be edited together. If a selection includes more than one style layer type, the map style editor may offer a selection of style layer types for a user to select and narrow down to a single type.

In an embodiment, the map style editor may display map style layer properties for a plurality of map style layers. The map style layer properties may be grouped by property name. A user may use the list to see what property values are assigned to the same style layer property across a plurality of map style layers. Additionally or alternatively, the map style layer properties may be grouped by property value. A user may use the list to see which style layers have the same value for a map style layer property. The user can easily view and modify similar style layer properties, rather than selecting and modifying each style layer individually.

Figure 6:
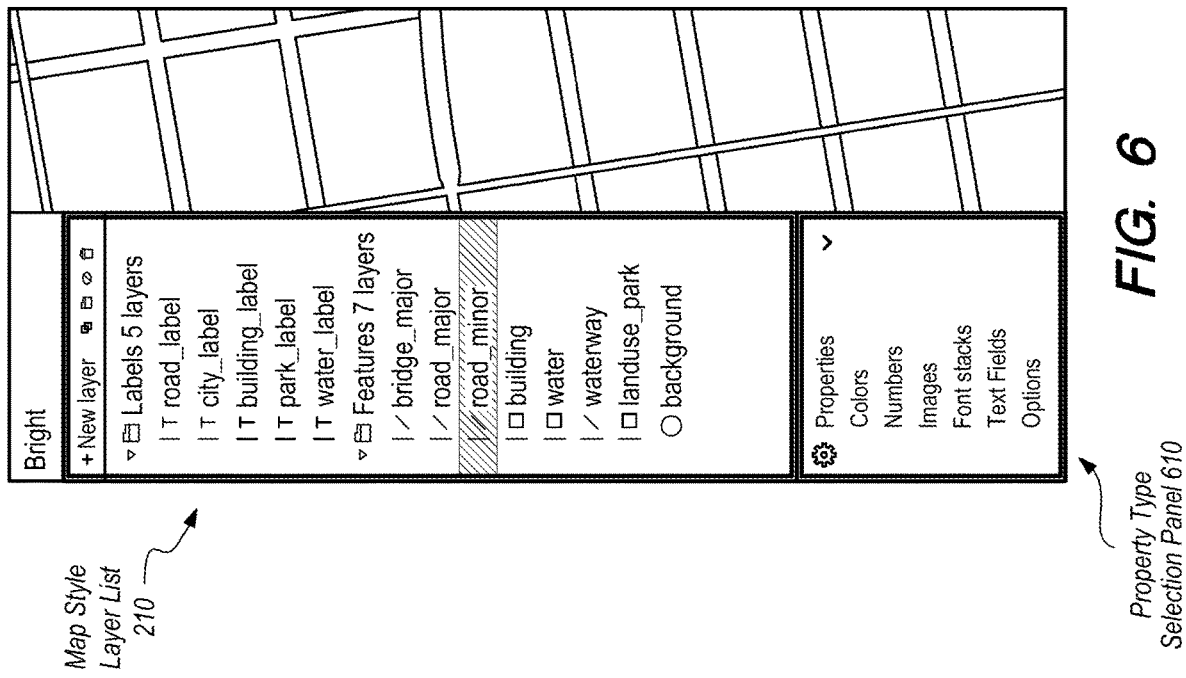
FIG. 6 illustrates a property types selection panel of a map style editor, according to an embodiment.

In an embodiment, a property type may be selected in order to view style layer properties of the selected property type. FIG. 6 illustrates an example property type selection panel. Property type selection panel 610 displays a list of property types. In the illustrated example, property types include colors, numbers, images, fonts, text fields, and style layer options. Selecting a property type causes the map style editor to display a list of style layer properties across all style layers of the selected map style that are of the selected property type. For example, if the "colors" property type is selected, then the map style editor may display all style layer properties that have a color value. As another example, selecting the "numbers" property type may display all style layer properties that have a number value.

In an embodiment, a style layer property in a style layer property list may be selected to view a list of style layer properties of the same type as the selected style layer property. For example, referring to FIG. 3, the "Color" property in style layer property list 310 may be selected. The "Color" property may be selected by clicking the property name in the style layer property list 310 or from a menu. Selecting the "Color" property may cause the map style editor to display a list of style layer properties, from all style layers in the map style, that are also a color property type.

In an embodiment, the style layer properties in the properties list may be grouped by property value. The map style editor may display a property value and a list of style layer properties that are assigned the property value. For example, the map style editor may group all style layer properties whose color value is "black," all style layer properties whose color value is "blue," and etc. Additionally or alternatively, the style layer properties may be grouped by property value and property name. For example, the map style editor may group all style layer properties that are line colors whose value is "black," text colors whose value is "black," fill colors whose value is "black," and etc. The map style editor may display a property name, a property value, and a list of style layers that have a property with the property name and property value.

Figure 7:
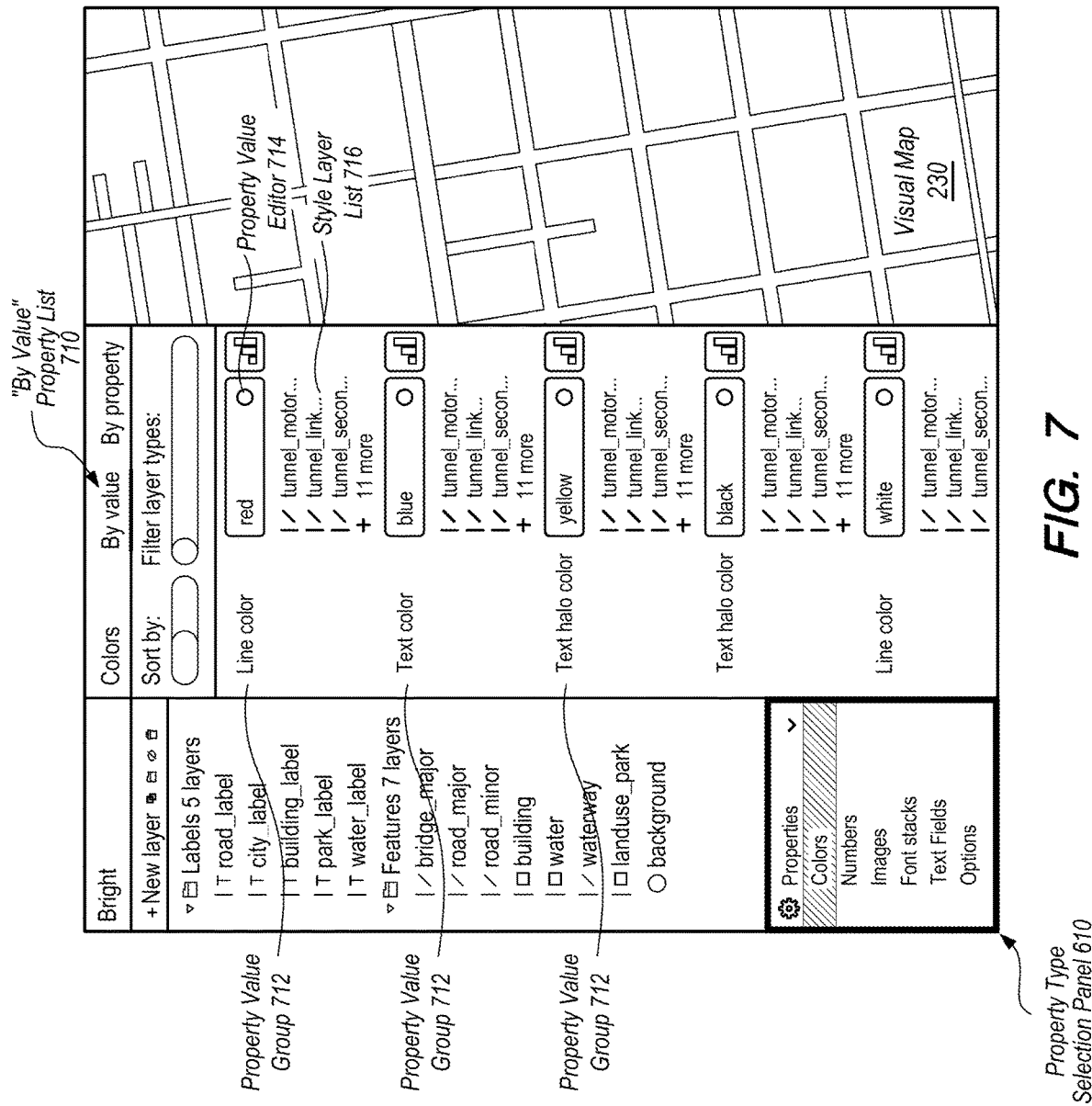
FIG. 7 illustrates a map style property list grouped by property value.

FIG. 7 illustrates an example list of style layer properties grouped by value. In the illustrated example, the "Colors" property type is selected in property type selection panel 610. "By Value" property list 710 displays a list of style layer properties that have a color value. The list of style layer properties is grouped by property value and property name. In the present example, "By Value" property list 710 comprises a plurality of property value groups, such as the ones indicated by property value group 712. "By Value" property list 710 displays the name of the style layer property and the property value for each property value group. For example, the first property value group 712 is a "line color" property with a value of "#e9ac77."

In an embodiment, each property value group includes a list of one or more style layers that have the particular style layer property. In FIG. 7, style layer list 716 is a list of style layers that have a "line color" property with a value of "#e9ac77."

In an embodiment, "By Value" property list 710 includes a property value editor for one or more property value groups, such as property value editor 714 for the "line color" property value group. In the illustrated example, property value editor 714 indicates the current value of the "line color" property value group.

Selecting a property editor may bring up a graphical editor where the user can select a value for the property, such as a color selection panel for the Color property. A user may also edit the property value by typing or pasting text into the text field. Other properties may have buttons or other types of user interface components that allow a user to select or specify a property value.

In an embodiment, if a user selects or modifies a value for a property value group, the map style editor assigns the property value to each style layer property within the property value group. For example, if the user edits the "line color" property value from "#e9ac77" to "#000000," each style layer listed in style layer list 716 will have their line color property value set to "#000000." In an embodiment, the visual map 230 is re-displayed to reflect the updated property values. Additionally or alternatively, the property list 710 may be updated to display the updated property value for the property value group. Additionally or alternatively, if the updated property value is the same as another property value group, the update property list 710 may combine the two property value groups.

In an embodiment, the style layer properties in the property list may be grouped by property name. The map style editor may display a property name and a list of style layers that have a property with the property name. For example, the map style editor may group all style layer properties that are line colors. For each property group, the map style editor may list each style layer that has the style layer property and the respective property value for the style layer property.

Figure 8:
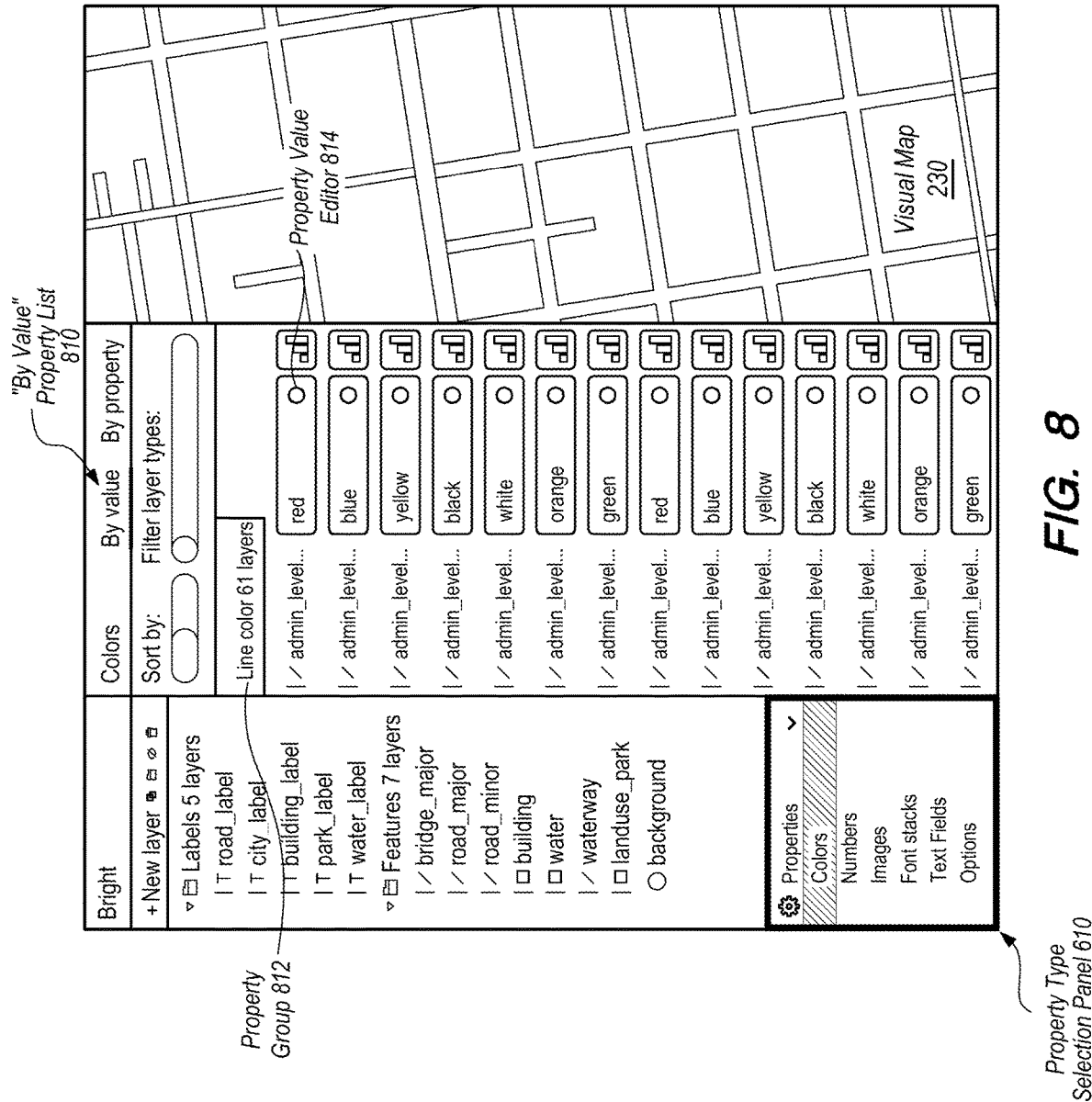
FIG. 8 illustrates a map style property list grouped by property.

FIG. 8 illustrates an example list of style layer properties grouped by property. In the illustrated example, the "Colors" property type is selected in property type selection panel 610. "By Property" property list 810 displays a list of style layer properties that have a color value. The list of style layer properties is grouped by property name. In the present example, "By Property" property list 810 comprises a plurality of property groups, such as the one indicated by property group 812. "By Property" property list 810 displays the name of a style layer property and one or more style layers that have the particular style layer property. Additionally or alternatively property list 810 may display a property value assigned to the style layer property for each style layer. For example, property list 810 indicates that "admin_level 2 maritime" has a property value of "a0c8f0" for the "line color" property.

In an embodiment, "By Property" property list 810 includes a property value editor for each style layer within a property group, such as property value editor 814 for the style layer "admin_level_2_maritime." In the illustrated example, property value editor 814 indicates the current value of the "line color" property of style layer "admin_level_2_maritime."

Selecting a property editor may bring up a graphical editor where the user can select a value for the property, such as a color selection panel for the Color property. A user may also edit the property value by typing or pasting text into the text field. Other properties may have buttons or other types of user interface components that allow a user to select or specify a property value. In an embodiment, selecting a property value assigns the property value to the style layer property of the corresponding style layer. Other style layers within the property group are not updated.

In an embodiment, the visual map 230 is re-displayed to reflect the updated property values. Additionally or alternatively, the property list 810 may be updated to display the updated property value for the property value group.

In an embodiment, after a map style layer property is edited, an updated map style layer property value may be stored in map style data 140 in association with the corresponding style layer property. The map style editor may automatically cause updated map style data to be uploaded or saved to database 120 after any change is made to the map style. Additionally or alternatively, the map style editor may periodically upload or save updated map style data to database 120. Additionally or alternatively, the map style editor may store update map style data in memory, and upload or save the stored map style upon a user action, such as clicking a "save" button or closing the map style editor.

Figure 9:
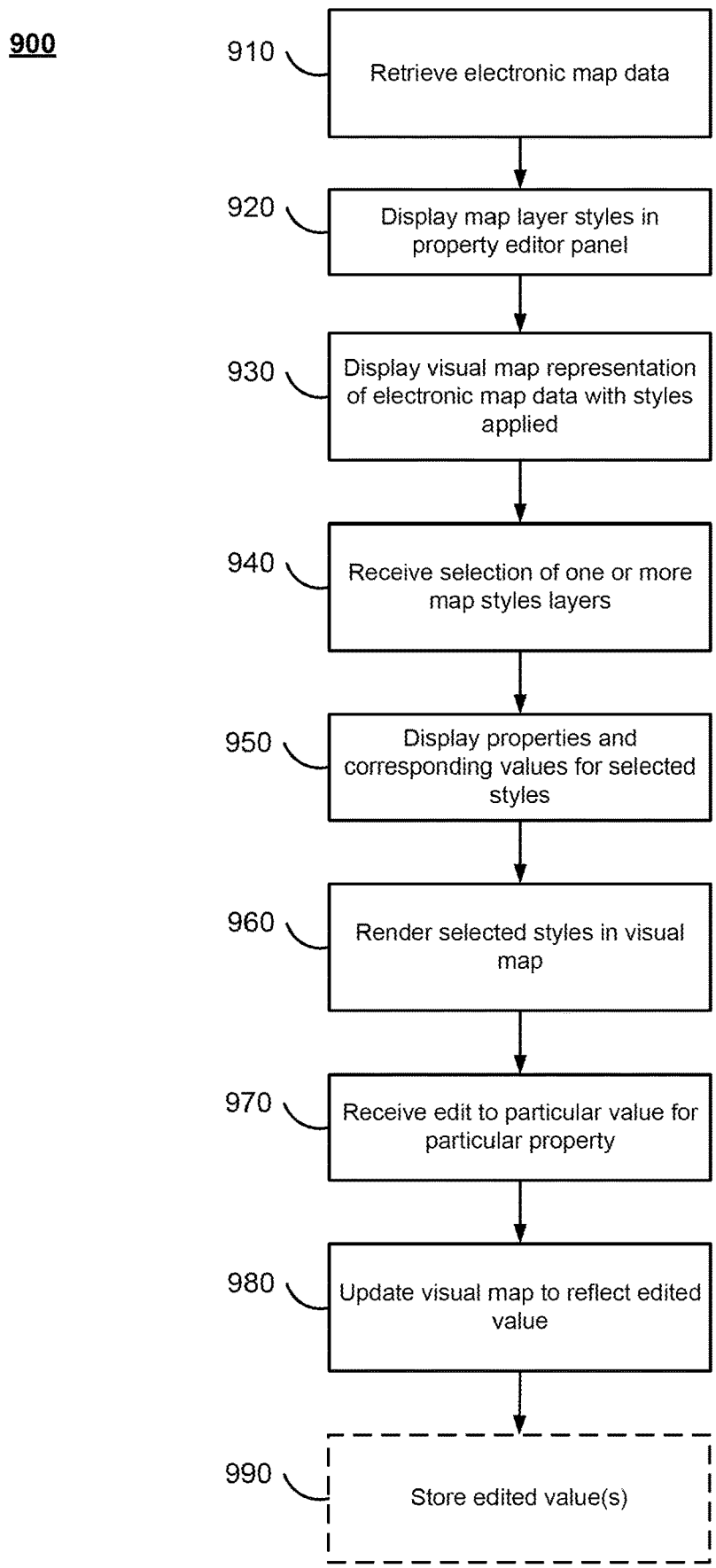
FIG. 9 illustrates a flowchart of a process for editing and representing property values for a digital map, according to an embodiment.

Referring to FIG. 9, a flowchart is shown of a process 900 for representing style layer properties at various zoom levels, according to one embodiment. In various embodiments, the operations of the process 900 of FIG. 9 may be implemented in programming by a server computer 105 or its components as described herein. For example, the operations of process 900 may be performed by the mapping application 110 according to map editing instructions 115 as described with reference to FIGS. 1-8. In some examples, the server computer 105 may execute a set of instructions or sequence of instructions (e.g., the map editing instructions 115) to control the functional elements of server computer 105 to perform the functions described below. Additionally or alternatively, server computer 105 may perform aspects of the functions described below using special-purpose hardware. In some embodiments, the map editing instructions 115 may instruct the server computer to interact with the database 120 to perform the functions described below using database interface 117. The process 900 steps with dashed outlines represent optional steps. In some embodiments, one or more functions described below may be performed by the client computing device 145.

Initially, the server computer 105 executing the mapping application 110 retrieves 910 electronic map data from a style sheet corresponding to a vector map tile set for a digital map, and displays 920 map layer styles in a property editor panel. Each map style layer references a portion of the electronic map data and one or more visual style rules to apply to the portion.

The server computer 105 executing the mapping application 110 displays 930 a visual map representing the electronic map data with the map layer styles applied.

The server computer 105 executing the mapping application 110 receives 940 selection of one or more map style layers from the map style layers.

For example, the server computer 105 executing the mapping application 110 may receive in the property editor panel input specifying a property type, and thus display style layer properties of the specified property type. Further, the one or more style layers may be grouped by property name and/or by property value.

The server computer 105 executing the mapping application 110 displays 950 style layer properties, and for each style layer property, a value corresponding to the selected one or more styles layers in the property editor panel, and renders 960 in the visual map only the selected style layers marked as visible.

The server computer 105 executing the mapping application 110 may receive 970 in the property editor panel a variety of edits, e.g., to a particular value for a particular style layer property. For example, if the displayed style layer properties are the same property type as the particular style layer property, the property editor panel edits comprise selection of an existing property value from the style layer properties that are the same property type as the particular style layer property. In addition, input specifying a style layer group can be received in the property editor panel and as a result the edit to the particular value for the particular style layer property sets the property value for every style layer in the style layer group. Similarly, input specifying a property value group can be received in the property editor panel and as a result the edit to the particular value for the particular style layer property sets the property value for each style layer property of the property value group.

Additionally or alternatively, the map style layers may be grouped by property name, and as a result property values shared by a particular style layer property name across the map style layers are displayed. The map style layers may be grouped by property value, and as a result the map style layers that share a particular map style layer property value are displayed. The map style layers may be grouped by both property name and property value, causing display of the map style layers that share the particular map style layer property name and map style property value.

The server computer 105 executing the mapping application 110 may store 990 the edited particular value for the particular style layer property.

The invention claimed is:

1. A method of editing and representing property values for a digital map, comprising:
   maintaining a style sheet for a digital map, wherein:
      the style sheet comprises a plurality of style layers, each style layer corresponding to a data layer of a set of data layers and each data layer including a subset of electronic map data representing map features of a particular type, and
      the plurality of style layers comprise a plurality of style layer properties defining visual representations within the digital map of map features within the respective data layer;
   displaying a user interface, the user interface comprising:
      a visual map representing the electronic map data according to the style sheet, wherein each data layer of a plurality of data layers is represented according to the respective style layer in the style sheet; and
      a map style layer list comprising a list of style layers from the style sheet, wherein the map style layer list includes a style layer group comprising a plurality of style layers;
   receiving a selection of the style layer group;
   adjusting the user interface to display a group map style layer property list comprising:
      a list of style layer properties of the selected style layer group; and
      for each style layer property in the list of style layer properties, a style layer property value;
   receiving an updated value for a particular style layer property in the list of style layer properties of the group map style layer property list; and
   updating, for each style layer in the style layer group, the particular style layer property to the updated value.

2. The method of claim 1,
   wherein the group map style layer property list further comprises, for each style layer property, a style layer property editor, and
   wherein receiving an update to a style layer property value comprises receiving a user input to the respective style layer property editor.

3. The method of claim 1, further comprising:
   wherein each style layer property comprises a style layer property type;
   wherein the user interface further comprises a property type selection panel comprising a list of a plurality of style layer property types;
   receiving a selection of a style layer property type; and
   adjusting the user interface to display a list of style layer properties corresponding to the selected style layer property type.

4. The method of claim 3, further comprising:
   wherein the list of style layer properties corresponding to the selected style layer property type is sorted by style layer property value; and
   listing, for each style layer property value in the list of style layer properties corresponding to the selected style layer property type, a set of style layers including the style layer property value.

5. The method of claim 4, further comprising:
   receiving an update to a style layer property value at the list of style layer properties corresponding to the selected style layer property type;

updating the style layer property value for each style layer in the set of style layers including the style layer property value; and adjusting the user interface to display an updated visual map representing the electronic map data according to the updated style layer property values.

6. The method of claim 1, wherein each style layer in the map style layer list is included in the visual map if a first style layer property of the style layer has a first style layer property value, wherein style layers in the map style layer list with the first style layer property set to a second style layer property value are not included in the visual map.

7. The method of claim 1, further comprising:

wherein the map style layer property list further comprises, for each style layer property, a style layer property editor;

receiving user selection of a particular style layer property editor; and adjusting the user interface to display an existing value selection editor corresponding to the particular style layer property editor.

8. A non-transitory computer-readable storage medium storing computer program instructions executable by a processor to perform steps for editing and representing property values for a digital map, the steps comprising:

maintaining a style sheet for a digital map, wherein:

the style sheet comprises a plurality of style layers, each style layer corresponding to a data layer of a set of data layers and each data layer including a subset of electronic map data representing map features of a particular type, and the plurality of style layers comprise a plurality of style layer properties defining visual representations within the digital map of map features within the respective data layer;

displaying a user interface, the user interface comprising:

a visual map representing the electronic map data according to the style sheet, wherein each data layer of a plurality of data layers is represented according to the respective style layer in the style sheet; and a map style layer list comprising a list of style layers from the style sheet, wherein the map style layer list includes a style layer group comprising a plurality of style layers;

receiving a selection of the style layer group;

adjusting the user interface to display a group map style layer property list comprising:

a list of style layer properties of the selected style layer group; and for each style layer property in the list of style layer properties, a style layer property value;

receiving an updated value for a particular style layer property in the list of style layer properties of the group map style layer property list; and updating, for each style layer in the style layer group, the particular style layer property to the updated value.

9. The non-transitory computer-readable storage medium of claim 8, wherein the group map style layer property list further comprises, for each style layer property, a style layer property editor, and wherein receiving an update to a style layer property value comprises receiving a user input to the respective style layer property editor.

10. The non-transitory computer-readable storage medium of claim 8, the steps further comprising:

wherein each style layer property comprises a style layer property type;

wherein the user interface further comprises a property type selection panel comprising a list of a plurality of style layer property types;

receiving a selection of a style layer property type; and adjusting the user interface to display a list of style layer properties corresponding to the selected style layer property type.

11. The non-transitory computer-readable storage medium of claim 10, the steps further comprising:

wherein the list of style layer properties corresponding to the selected style layer property type is sorted by style layer property value; and listing, for each style layer property value in the list of style layer properties corresponding to the selected style layer property type, a set of style layers including the style layer property value.

12. The non-transitory computer-readable storage medium of claim 11, the steps further comprising:

receiving an update to a style layer property value at the list of style layer properties corresponding to the selected style layer property type;

updating the style layer property value for each style layer in the set of style layers including the style layer property value; and adjusting the user interface to display an updated visual map representing the electronic map data according to the updated style layer property values.

13. The non-transitory computer-readable storage medium of claim 8, wherein each style layer in the map style layer list is included in the visual map if a first style layer property of the style layer has a first style layer property value, wherein style layers in the map style layer list with the first style layer property set to a second style layer property value are not included in the visual map.

14. The non-transitory computer-readable storage medium of claim 8, the steps further comprising:

wherein the map style layer property list further comprises, for each style layer property, a style layer property editor;

receiving user selection of a particular style layer property editor; and adjusting the user interface to display an existing value selection editor corresponding to the particular style layer property editor.

15. A system comprising:

one or more processors; and a non-transitory computer-readable storage medium storing computer program instructions executable by the one or more processors to perform steps for editing and representing property values for a digital map, the steps comprising:

maintaining a style sheet for a digital map, wherein:

the style sheet comprises a plurality of style layers, each style layer corresponding to a data layer of a set of data layers and each data layer including a subset of electronic map data representing map features of a particular type, and the plurality of style layers comprise a plurality of style layer properties defining visual representations within the digital map of map features within the respective data layer;

displaying a user interface, the user interface comprising:

a visual map representing the electronic map data according to the style sheet, wherein each data layer of a plurality of data layers is represented according to the respective style layer in the style sheet; and a map style layer list comprising a list of style layers from the style sheet, wherein the map style layer list includes a style layer group comprising a plurality of style layers;

receiving a selection of the style layer group;

adjusting the user interface to display a group map style layer property list comprising:

a list of style layer properties of the selected style layer group; and for each style layer property in the list of style layer properties, a style layer property value;

receiving an updated value for a particular style layer property in the list of style layer properties of the group map style layer property list; and updating, for each style layer in the style layer group, the particular style layer property to the updated value.

16. The system of claim 15, wherein the group map style layer property list further comprises, for each style layer property, a style layer property editor, and wherein receiving an update to a style layer property value comprises receiving a user input to the respective style layer property editor.

17. The system of claim 15, the steps further comprising:

wherein each style layer property comprises a style layer property type;

wherein the user interface further comprises a property type selection panel comprising a list of a plurality of style layer property types;

receiving a selection of a style layer property type; and adjusting the user interface to display a list of style layer properties corresponding to the selected style layer property type.

18. The system of claim 17, the steps further comprising:

wherein the list of style layer properties corresponding to the selected style layer property type is sorted by style layer property value; and listing, for each style layer property value in the list of style layer properties corresponding to the selected style layer property type, a set of style layers including the style layer property value.

19. The system of claim 18, the steps further comprising:

receiving an update to a style layer property value at the list of style layer properties corresponding to the selected style layer property type;

updating the style layer property value for each style layer in the set of style layers including the style layer property value; and adjusting the user interface to display an updated visual map representing the electronic map data according to the updated style layer property values.

20. The system of claim 15, wherein each style layer in the map style layer list is included in the visual map if a first style layer property of the style layer has a first style layer property value, wherein style layers in the map style layer list with the first style layer property set to a second style layer property value are not included in the visual map.

* * * * *